US012585452B2

(12) United States Patent
Yamada et al.

(10) Patent No.: US 12,585,452 B2
(45) Date of Patent: Mar. 24, 2026

(54) VEHICLE CONTROL DEVICE, VEHICLE SYSTEM AND UPDATE SYSTEM

(71) Applicant: HITACHI ASTEMO, LTD.,
Hitachinaka (JP)

(72) Inventors: Tetsuya Yamada, Tokyo (JP); Mikio Kataoka, Tokyo (JP); Keita Nakazawa, Tokyo (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 251 days.

(21) Appl. No.: 18/253,790

(22) PCT Filed: Sep. 7, 2021

(86) PCT No.: PCT/JP2021/032908
§ 371 (c)(1),
(2) Date: May 22, 2023

(87) PCT Pub. No.: WO2022/153591
PCT Pub. Date: Jul. 21, 2022

(65) Prior Publication Data
US 2023/0418587 A1     Dec. 28, 2023

(30) Foreign Application Priority Data

Jan. 12, 2021     (JP) ................................. 2021-002608

(51) Int. Cl.
*G06F 9/445*          (2018.01)
*G06F 8/65*           (2018.01)
(Continued)

(52) U.S. Cl.
CPC .............. *G06F 8/65* (2013.01); *G06F 11/079* (2013.01); *G07C 5/008* (2013.01)

(58) Field of Classification Search
CPC ......... H04W 4/40; H04W 12/37; H04W 4/46; H04W 4/48; H04W 84/12; H04W 92/18;
(Continued)

(56) References Cited

U.S. PATENT DOCUMENTS

| | | | |
|---|---|---|---|
| 2015/0100953 A1* | 4/2015 | Yim ........................... | G06F 8/71 717/170 |
| 2019/0102158 A1* | 4/2019 | Thanayankizil ...... | H04W 8/245 |
| 2020/0174781 A1* | 6/2020 | Buecherl ................. | H04L 67/34 |

FOREIGN PATENT DOCUMENTS

| | | |
|---|---|---|
| JP | 2011-148398 A | 8/2011 |
| JP | 2018-055191 A | 4/2018 |

OTHER PUBLICATIONS

International Search Report with English Translation and Written Opinion of International Patent Application No. PCT/JP2021/ 032908 dated Nov. 30, 2021 (9 pages).

* cited by examiner

*Primary Examiner* — Chuck O Kendall
(74) *Attorney, Agent, or Firm* — Foley & Lardner LLP

(57) ABSTRACT

An object of the present invention is to provide a program update technique capable of easily managing a software state of an electronic control unit (ECU), and updating an ECU application and a data collecting program in association with each other with management information about the software states matching between a vehicle and a center. A vehicle control device of the present invention collectively transmits a first update state of a first program executed by the vehicle control device and a second update state of a second program executed by a second vehicle control device to an update server, receives an update version of the program corresponding to the first update state and an (Continued)

ECU14, ECU15, AND ECU16 EXECUTE OPERATION PROGRAM, AND OUTPUT OPERATION RESULTS (PROCESSING RESULT) TO IN-VEHICLE NETWORK — S11

ECU13 EXECUTES COLLECTING RULE PROGRAM, AND CAUSES COLLECTING UNIT TO ACCUMULATE COLLECTED LOG — S12

ECU13 EXECUTES OPERATION PROGRAM, AND CAUSES OPERATION UNIT TO GENERATE LOG FROM COLLECTED LOG — S13

ECU13 CAUSES OUTPUT UNIT TO OUTPUT LOG TO DATA CENTER WITH TRANSMISSION FREQUENCY DESCRIBED IN COLLECTING RULE — S14 update version of the program corresponding to the second update state from the update server, and executes update processing (FIG. 1).

12 Claims, 7 Drawing Sheets

(51) Int. Cl.
   *G06F 11/07*          (2006.01)
   *G07C 5/00*          (2006.01)
(58) Field of Classification Search
   CPC ..... G06F 8/65; G06F 8/60; G06F 8/61; G06F
                                 8/656; G06F 30/15
   See application file for complete search history.

FIG. 3

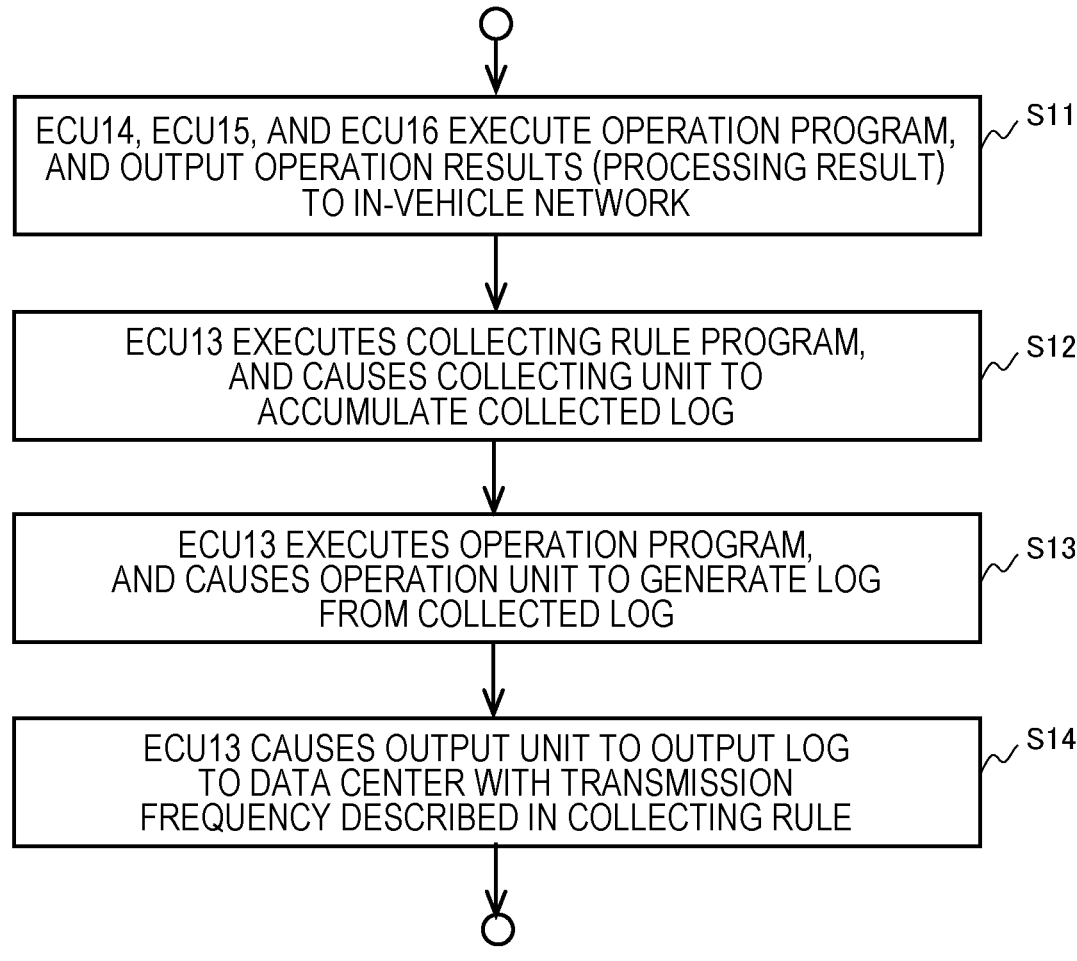

ECU14, ECU15, AND ECU16 EXECUTE OPERATION PROGRAM, AND OUTPUT OPERATION RESULTS (PROCESSING RESULT) TO IN-VEHICLE NETWORK — S11

ECU13 EXECUTES COLLECTING RULE PROGRAM, AND CAUSES COLLECTING UNIT TO ACCUMULATE COLLECTED LOG — S12

ECU13 EXECUTES OPERATION PROGRAM, AND CAUSES OPERATION UNIT TO GENERATE LOG FROM COLLECTED LOG — S13

ECU13 CAUSES OUTPUT UNIT TO OUTPUT LOG TO DATA CENTER WITH TRANSMISSION FREQUENCY DESCRIBED IN COLLECTING RULE — S14

FIG. 4

| | | |
|---|---|---|
| VEHICLE IDENTIFICATION NUMBER (VIN) | | XX |
| RECORDING DAY | | XX |
| CAN1 | DATABASE NUMBER | XX |
| ECU1 | HARDWARE ID | XX |
| ECU1 | PROGRAM 1-ID | XX |
| ECU2 | PROGRAM 2-ID | XX |
| ECU2 | PROGRAM 3-ID | XX |
| ECU1 | FREE CANID | XX |
| ECU1 | FREE ROM SPACE | XX |
| ECU2 | HARDWARE ID | XX |
| ECU2 | PROGRAM 1-ID | XX |
| ECU2 | FREE CANID | XX |
| ECU2 | FREE ROM SPACE | XX |

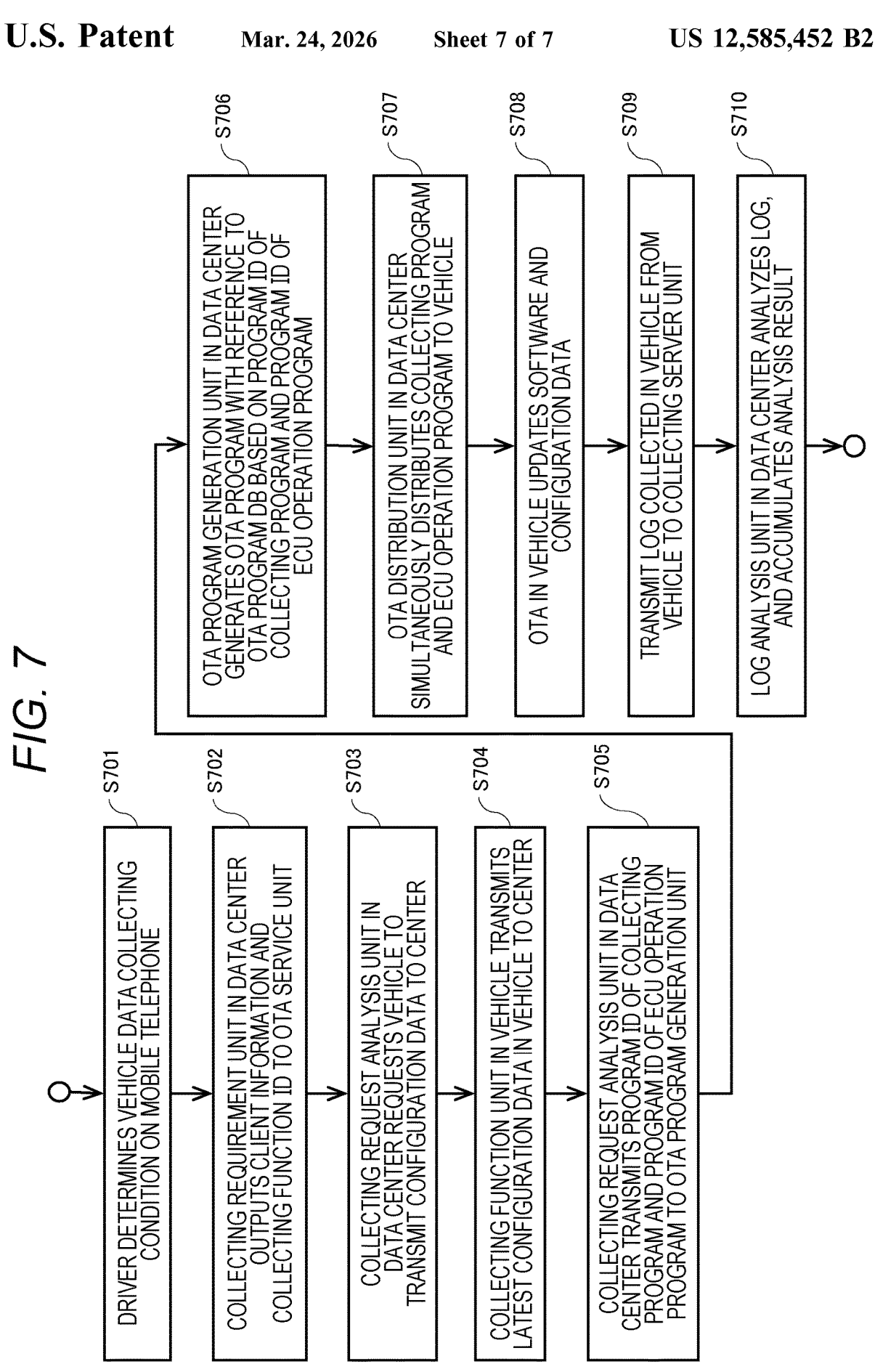

S701 — DRIVER DETERMINES VEHICLE DATA COLLECTING CONDITION ON MOBILE TELEPHONE

S702 — COLLECTING REQUIREMENT UNIT IN DATA CENTER OUTPUTS CLIENT INFORMATION AND COLLECTING FUNCTION ID TO OTA SERVICE UNIT

S703 — COLLECTING REQUEST ANALYSIS UNIT IN DATA CENTER REQUESTS VEHICLE TO TRANSMIT CONFIGURATION DATA TO CENTER

S704 — COLLECTING FUNCTION UNIT IN VEHICLE TRANSMITS LATEST CONFIGURATION DATA IN VEHICLE TO CENTER

S705 — COLLECTING REQUEST ANALYSIS UNIT IN DATA CENTER TRANSMITS PROGRAM ID OF COLLECTING PROGRAM AND PROGRAM ID OF ECU OPERATION PROGRAM TO OTA PROGRAM GENERATION UNIT

S706 — OTA PROGRAM GENERATION UNIT IN DATA CENTER GENERATES OTA PROGRAM WITH REFERENCE TO OTA PROGRAM DB BASED ON PROGRAM ID OF COLLECTING PROGRAM AND PROGRAM ID OF ECU OPERATION PROGRAM

S707 — OTA DISTRIBUTION UNIT IN DATA CENTER SIMULTANEOUSLY DISTRIBUTES COLLECTING PROGRAM AND ECU OPERATION PROGRAM TO VEHICLE

S708 — OTA IN VEHICLE UPDATES SOFTWARE AND CONFIGURATION DATA

S709 — TRANSMIT LOG COLLECTED IN VEHICLE FROM VEHICLE TO COLLECTING SERVER UNIT

S710 — LOG ANALYSIS UNIT IN DATA CENTER ANALYZES LOG, AND ACCUMULATES ANALYSIS RESULT

VEHICLE CONTROL DEVICE, VEHICLE SYSTEM AND UPDATE SYSTEM

TECHNICAL FIELD

The present invention relates to a technique for updating a program executed by a vehicle control device that controls an operation of a vehicle.

BACKGROUND ART

Vehicle control devices (electronic control units (ECUs) that control vehicles are interconnected via an in-vehicle network. In recent years, a vehicle system constituting an in-vehicle network is generally connected to a communication network, and a vehicle and a center transmit and receive data and programs bidirectionally. Examples of data transmission from the center to the vehicle include Firmware On The Air (FOTA) that updates an ECU program, map data update of car navigation, and music data distribution. As an example of transmitting data from the vehicle to the center, component diagnosis information about the vehicle is uploaded to the center, the center side transmits the diagnosis information to a dealer, and a component of the vehicle is replaced (component management).

PTL 1 below describes an example where a traveling status of a vehicle is collected in the vehicle and a collected log is uploaded to a center. In PTL 1, a collecting function of the vehicle is changed by distributing a data collecting program from the center to the vehicle. Accordingly, in PTL 1, it is possible to change a log collecting condition, a log collecting frequency, an upload transmission frequency, and the like.

As the collecting of information from the vehicle proceeds, a demand for collecting information that cannot be collected by a current vehicle function is increasing. For example, it is conceivable to utilize car navigation information and infotainment information for marketing. In order to collect information that cannot normally be collected, such as route information from a car navigation system and a number of reproducing times of music being listened to, a data collecting function provided in the vehicle needs to be updated. For example, desired data can be collected by adding an application function of an ECU from which data is to be collection with Over the Air (OTA) and outputting a calculation result to a controller area network (CAN).

That is, even information that has not been collected by the vehicle so far can be transmitted to the center by adding the application function of the ECU with the OTA. Accordingly, for example, also in applications such as route information for a delivery carrier and traveling information for each customer of a taxi, the vehicle similarly collects their logs and transmits the logs to the center, and the center can analyze these pieces of information.

CITATION LIST

Patent Literature

PTL 1: JP 2018-055191 A

SUMMARY OF INVENTION

Technical Problem

When new information is collected from a vehicle, a function necessary for an application outputting the new information may be insufficient. At this time, in order that the vehicle collects new information, not only a data collecting program but also an operation program for adding an application function are necessarily updated at the same time. At this time, both the ECU equipped with the application and another ECU equipped with the data collecting function are updated by the OTA.

As data items collected from the vehicle is customization by the OTA, the states of software of respective ECUs mounted on the vehicle cannot be easily acquired. Therefore, a technique is demanded to be capable of easily managing a software state, such as a software version of an ECU mounted on the vehicle and a free ROM space.

In a case where the data collecting program and the ECU application are updated by the OTA in the center, these updates are necessarily associated with each other. It is, therefore, required to perform management so that management information about the software states matches between the vehicle and the center, and to update the ECU application and the data collecting program in association with each other using the management information.

The present invention is made in view of the above problems, and an object of the present invention is to provide a program update technique capable of easily managing a software state of an ECU, and updating an ECU application and a data collecting program in association with each other with management information about software states matching between a vehicle and a center.

Solution to Problem

A vehicle control device of the present invention collectively transmits a first update state of a first program executed by the vehicle control device and a second update state of a second program executed by a second vehicle control device to an update server, receives an update version of the program corresponding to the first update state and an update version of the program corresponding to the second update state from the update server, and executes update processing.

Advantageous Effects of Invention

The vehicle control device of the present invention enables an update state of software installed in each vehicle control device to be collectively managed. Further, an application program and a data collecting program corresponding to the update state can be updated in association with each other.

BRIEF DESCRIPTION OF DRAWINGS

FIG. 3 is a flowchart describing that an electronic control unit (ECU) 13 collects data from each ECU.

FIG. 4 illustrates an example of config data 1382.

FIG. 6 is a configuration diagram of a data center 2.

FIG. 7 is a flowchart describing that the data center 2 updates a collecting program 1371 and an operation program.

DESCRIPTION OF EMBODIMENTS

First Embodiment

In a first embodiment of the present invention, it is assumed that data in a vehicle is collected and a data log thereof is uploaded to a center. An update system according to the first embodiment provides means for updating a data collecting program and an application in association with each other in a case where a necessary function is insufficient in an electronic control unit (ECU) application.

Figure 1:
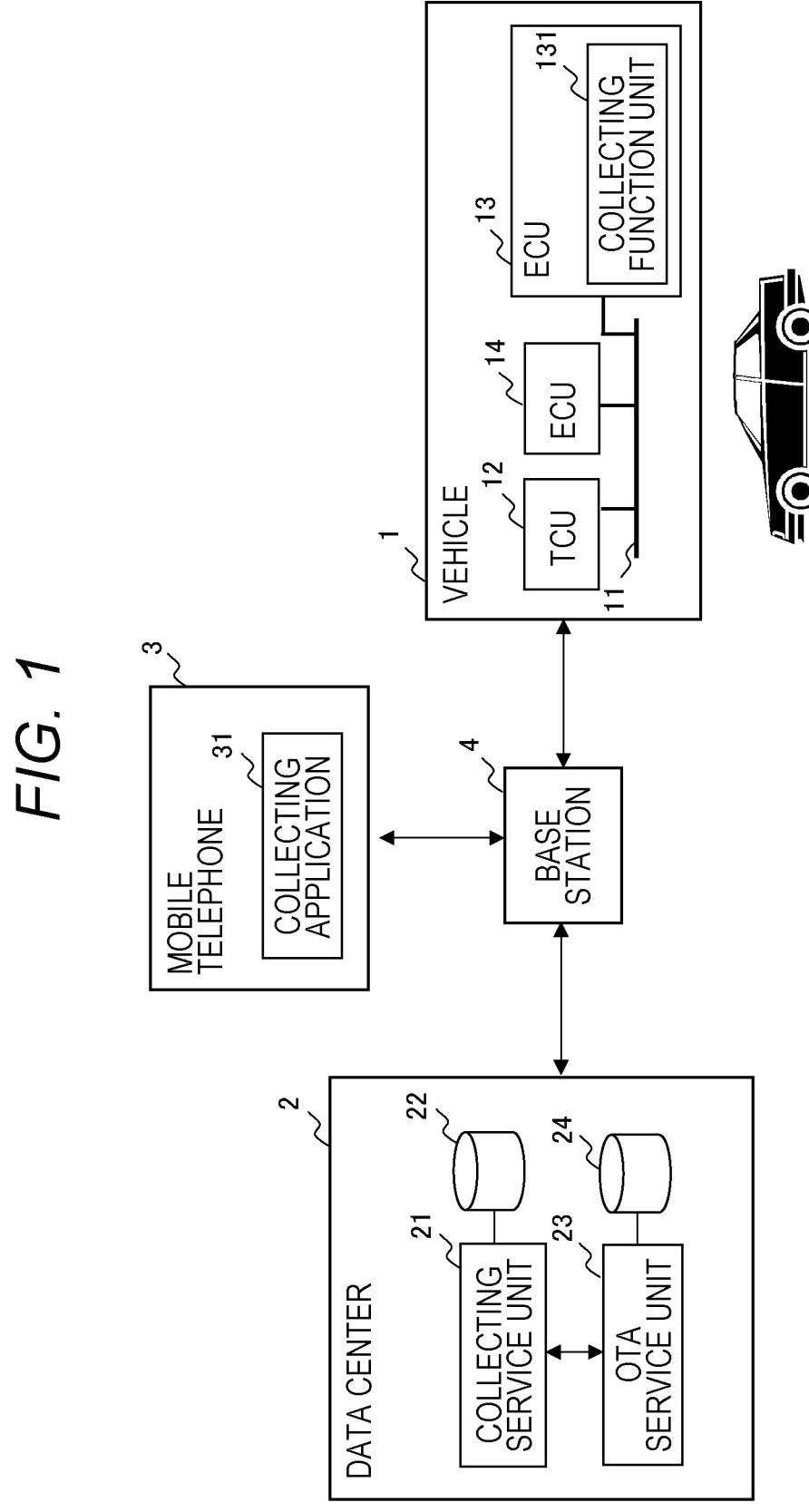
FIG. 1 is a system configuration diagram of an update system according to a first embodiment.

FIG. 1 is a system configuration diagram of the update system according to the first embodiment. The update system is a system that updates a program to be executed by the ECU mounted on a vehicle 1. The update system is configured such that the vehicle 1, a data center 2, and a mobile telephone 3 can communicate with each other via a base station 4. A driver of the vehicle 1 can customize data items collected on the vehicle 1 via the mobile telephone 3. The data center 2 includes, for example, a server computer.

On the mobile telephone 3, the driver designates which data of the vehicle 1 is collected for applications such as marketing and telematic insurance. On the data center 2 side, a collecting service unit 21 aggregates the data collecting items designated on the mobile telephone 3. The collecting service unit 21 transmits collecting requirements corresponding to the collecting items to an Over The Air (OTA) service unit 23. The OTA service unit 23 analyzes the collecting requirements and creates a data collecting program and an ECU application (hereinafter, referred to as an operation program) corresponding to a vehicle type of the vehicle 1 from an OTA program database 24. The OTA service unit 23 distributes the created program to the vehicle 1 using OTA. A log 22 is data collected from the vehicle, and this log is provided to a marketing application or a telematic insurance service application to be utilized.

The vehicle 1 is equipped with a communication unit (transmission control unit (TCU)) 12, an ECU 13, and an ECU 14 on an in-vehicle network 11. The ECU 13 can collect various types of data of the vehicle 1 using a collecting function unit 131. The ECU 14 executes an operation program including applications, such as infotainment and car navigation. The programs executed by the respective ECUs are updated by an OTA function of the data center 2. For example, the ECU 14 calculates travel route information under a certain condition and outputs the information to the in-vehicle network 11. The ECU 13 records the travel route information every one minute and transmits the travel route information to the data center 2 every three hours. The in-vehicle network 11 is a communication network such as a control area network (CAN) bus.

Figure 2:
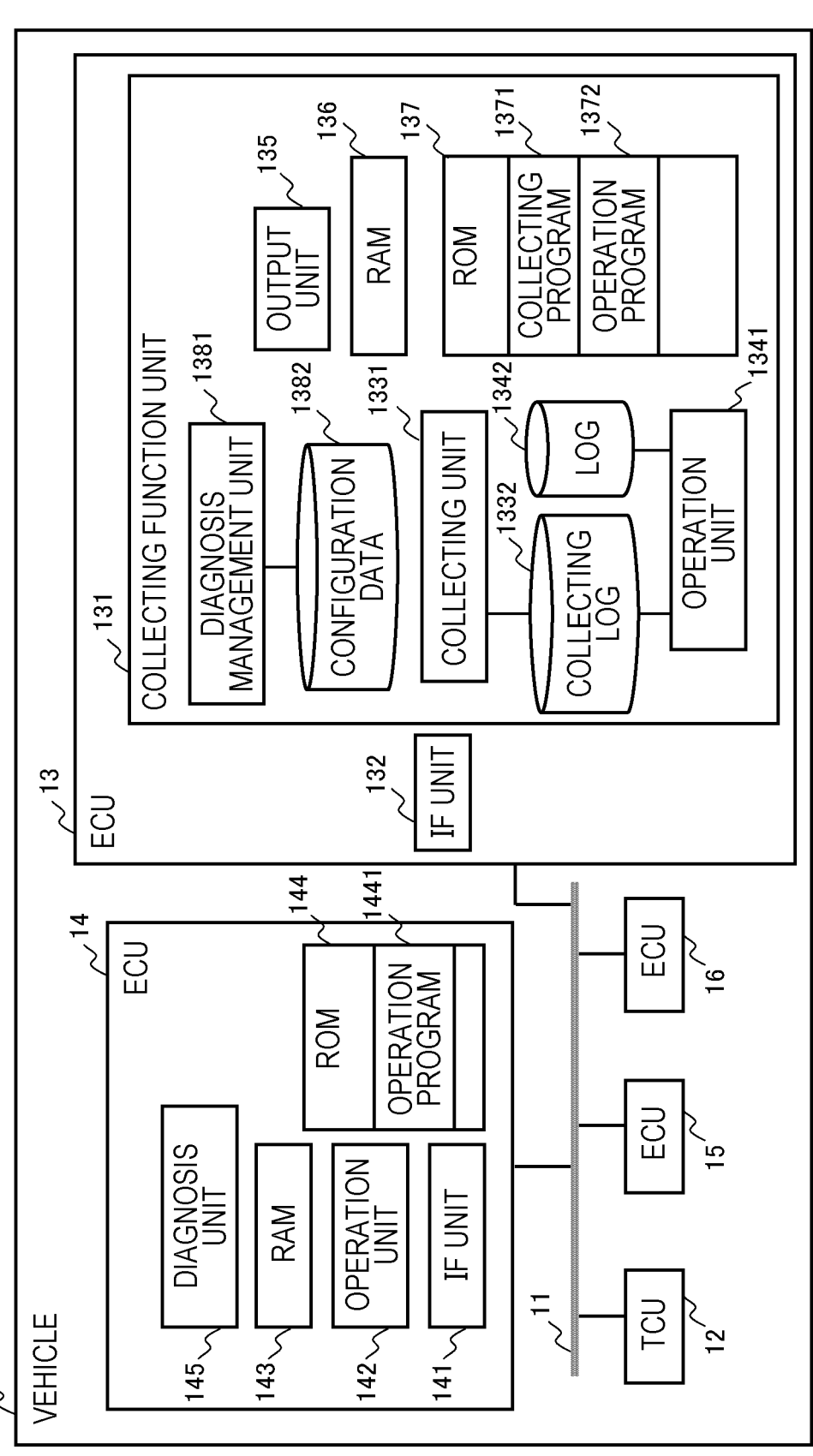
FIG. 2 is a configuration diagram of a vehicle system included in a vehicle 1.

FIG. 2 is a configuration diagram of a vehicle system included in the vehicle 1. The vehicle system is configured by connecting the communication unit 12, the ECU 13, the ECU 14, an ECU 15, an ECU 16, and the like to the in-vehicle network 11 (for example, a CAN network).

The ECU 13 collects update states of software of the ECUs and collects data items indicating the state of the vehicle 1. The ECU 13 includes an interface unit 132 and the collecting function unit 131. The interface unit 132 is a communication interface that communicates with other devices via the in-vehicle network 11. The collecting function unit 131 includes the following components.

A collecting unit 1331 collects data on the in-vehicle network 11. A collecting log 1332 is obtained by accumulating the data collected by the collecting unit 1331. An operation unit 1341 processes and calculates the log collected by the collecting unit 1331 based on a specific format or condition. A log 1342 is obtained by accumulating calculation results obtained by the operation unit 1341 and is data to be transmitted to the data center 2. An output unit 135 outputs the log 1342 at a specific frequency or cycle, and a random access memory (RAM) 136 temporarily saves data. A nonvolatile read only memory (ROM) 137 saves programs and data even after a power supply of the ECU 13 is shut off. The nonvolatile ROM 137 stores a collecting program 1371 and an operation program 1372. The collecting program 1371 is a program having a collecting method and a data output method. The operation program 1372 is a program having data format conversion and an operation flow. Configuration data 1382 (hereinafter, abbreviated as config data 1382) describes update states such as software versions of all the ECUs in the vehicle 1. A diagnosis management unit 1381 collects the config data 1382 from each ECU. The collecting log, the log, and the config data are stored in means, such as a secure digital (SD) card, that stores data as nonvolatile data such that the contents thereof are retained even after the power supply of the ECU 13 is shut off The ECU 14 includes an interface unit 141 for the in-vehicle network 11, an operation unit 142, a RAM 143, a nonvolatile ROM 144, and a diagnosis unit 145. The nonvolatile ROM 144 stores an operation program 1441 having an application provided by the ECU 14. The diagnosis unit 145 aggregates a defect and information in the ECU 14 and responds to a defect command. The diagnosis management unit 1381 also has a function similar to the function of the diagnosis unit 145.

When a program is updated by the OTA, the ROM included in each ECU is a double bank. The double bank is a mechanism where two program areas are prepared, one of the program areas is validated to be used, the remaining one of the program areas is rewritten by OTA, and then the valid one of the program areas is switched. In the first embodiment, the operation programs 1372 and 1441 and the collecting program 1371 have a double bank configuration that is omitted in FIG. 2.

FIG. 3 is a flowchart describing a procedure for the ECU 13 collecting data from each ECU. Each of the ECU 14, the ECU 15, and the ECU 16 executes its own operation program and outputs an operation result (processing result) to the in-vehicle network 11 (S11). In the ECU 13, the collecting unit 1331 executes the collecting program 1371 to collect data on the in-vehicle network 11 and accumulate the collecting log 1332 (S12). In the ECU 13, the operation unit 1341 executes the operation program 1372 to perform format conversion and calculation on the collecting log 1332 and generate the log 1342 (S13). In the ECU 13, the output unit 135 transmits the log 1342 to the data center 2 at the transmission frequency described in a collecting rule (S14).

Each of the ECUs 13 to 16 includes the operation unit (operation program). When a function is added to the ECUs 14 to 16 (data items to be collected are changed), the operation programs of these ECUs are necessarily changed. In a case where only a processing operation such as format change is changed without changing the data items to be collected, it is sufficient to change the operation program in the ECU 13.

When a new collecting function is added to the existing collecting function of the collecting function unit 131 (for example, a data item to be collected is added), not only the collecting program 1371 but also the operation program of an ECU that is a target for the collecting are necessarily updated in a certain case. An example of such a case is a case where the operation program requires a new function to output a data item to be collected. In this way, in a case where the operation programs of the ECUs are updated by customization of the vehicle 1, there is a concern that the programs are updated by programs inappropriate to the ECU hardware configurations unless the update states of the software of all the ECUs of the vehicle 1 are correctly acquired. Alternatively, when the collecting program 1371 is updated and the operation programs of the ECUs are updated, there is a concern that an update version of the program that is inconsistent between the collecting program 1371 and the operation program is updated. Therefore, in the first embodiment, the software in the vehicle 1 is centrally managed by the ECU 13. The config data 1382 is data holding centralized management information.

FIG. 4 illustrates an example of the config data 1382. The config data in FIG. 4 holds a hardware ID, a program ID, a CAN database number, a free CANID, and a free ROM space of the ECU. In a case where a plurality of applications is installed in a microcomputer of the ECU, a plurality of program IDs is described. As the ECU software is further customized, the CANID may be consumed by outputting a new CAN data item depending on a function. Alternatively, the free ROM space consumed by the program update also varies. Therefore, in FIG. 4, the free CANID and the free ROM space are also held. A determination can be made whether a new program can be installed in accordance with these data items.

Figure 5:
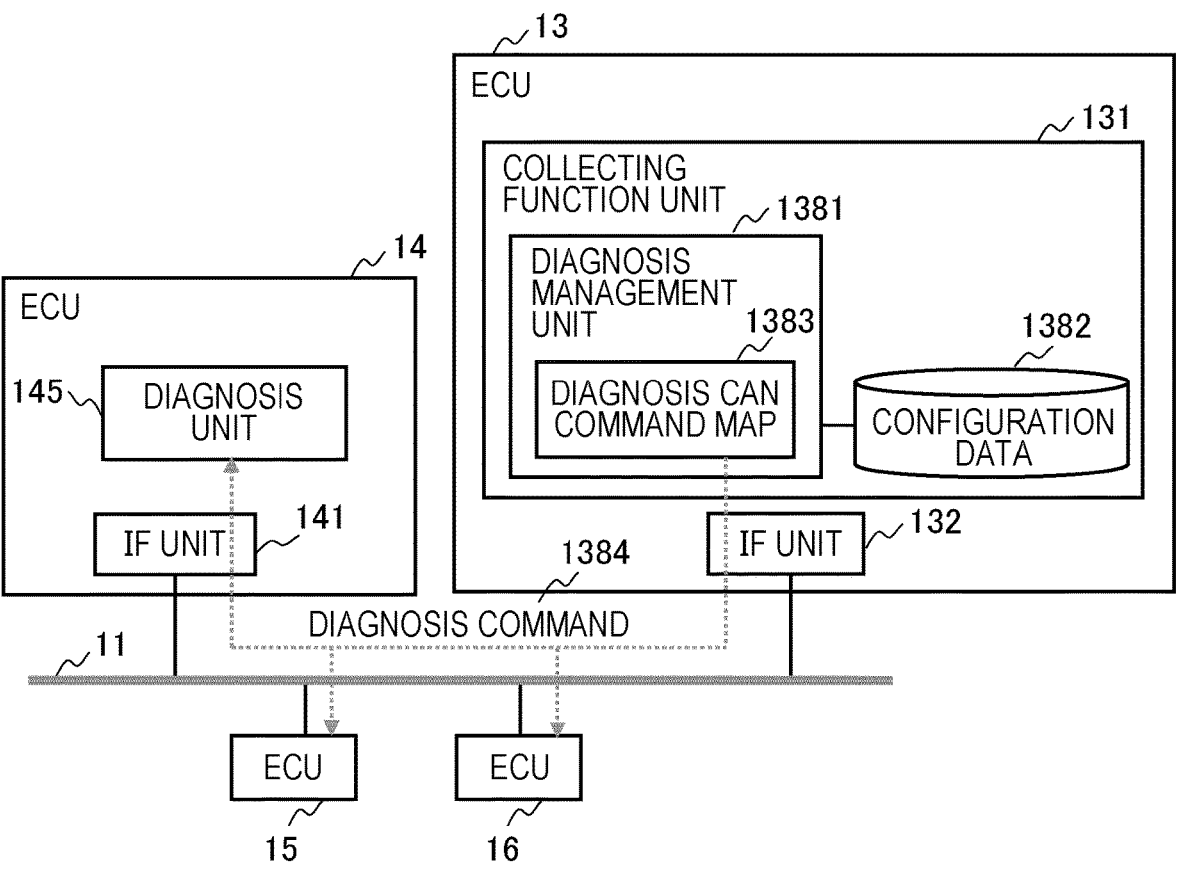
FIG. 5 is a diagram describing generation of the config data 1382.

FIG. 5 is a diagram describing generation of the config data 1382. The diagnosis management unit 1381 includes a diagnosis CAN command map 1383 having diagnosis commands for inquiring of all the ECUs (ECUs 14 to 16 in FIG. 5) in the vehicle 1 about update states of software. The diagnosis management unit 1381 sequentially issues a diagnosis command 1384 on the in-vehicle network 11 based on the diagnosis CAN command map 1383. The diagnosis unit 145 of the target ECU (for example, the ECU 14) creates software configuration information as illustrated in FIG. 4 similarly to the defect information, and returns the software configuration information to the ECU 13 as a response to the diagnosis command 1384. The diagnosis management unit 1381 can similarly create the config data 1382 by collecting the software configuration information from all the ECUs.

Since the contents of the diagnosis commands may be different for the respective ECUs, the contents may be defined for the respective ECUs. Destination information about the respective ECUs may be described together with the diagnosis commands. The diagnosis commands do not necessarily have to be newly developed to implement the present invention, and a command for inquiring about a software version, a free ROM space, or the like in an existing defect diagnosis procedure may be used. However, while conventional diagnosis commands are for individually diagnosing respective ECUs, the diagnosis commands of the present invention are different from the conventional diagnosis commands in that they are used not only for the diagnosis but also for collecting the config data 1382.

Figure 6:
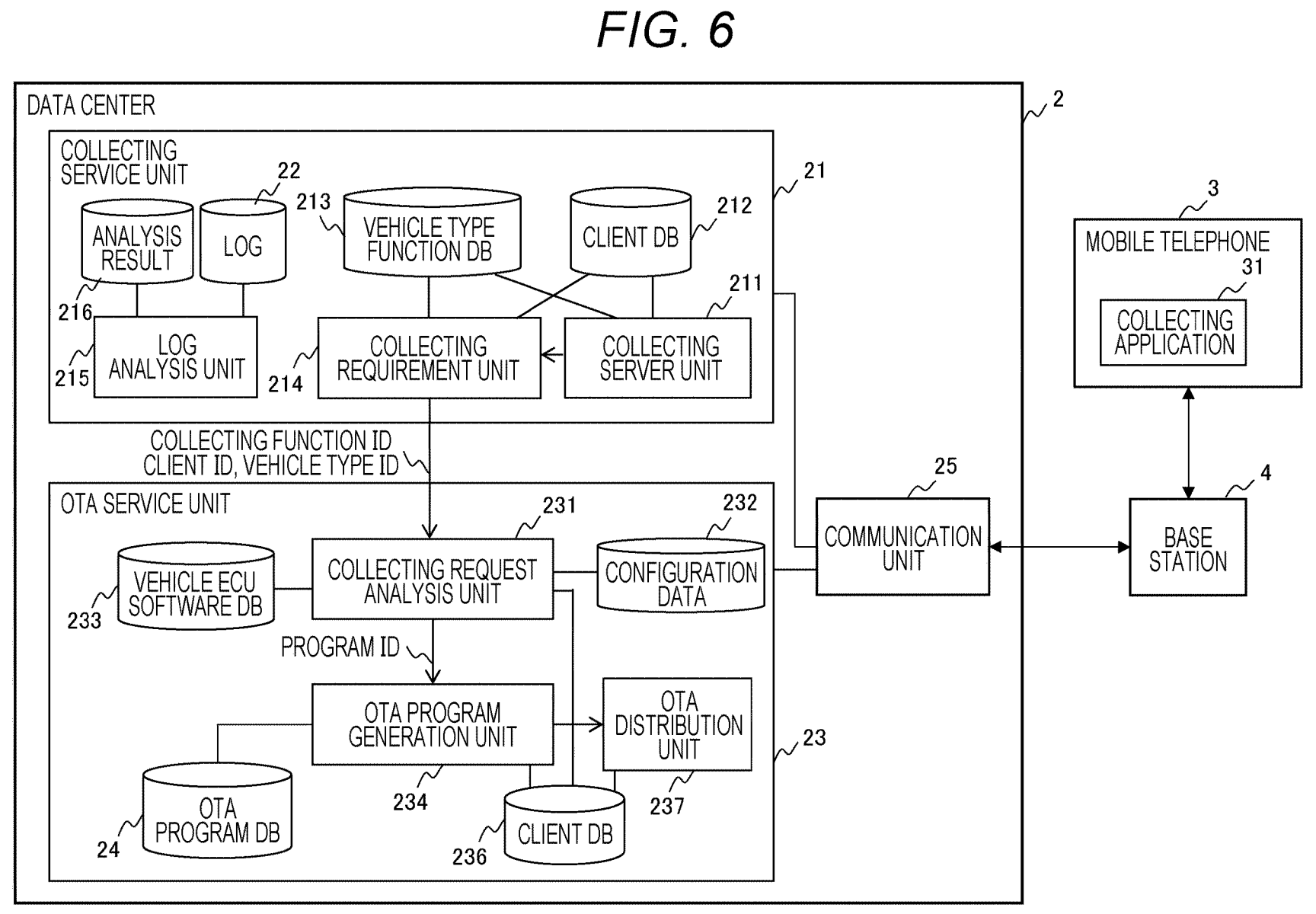

FIG. 6 is a configuration diagram of the data center 2. The data center 2 includes a communication unit 25 that communicates with other devices via the base station 4, the collecting service unit 21, and the OTA service unit 23.

Based on the data collecting items designated on the mobile telephone 3 by the driver, the collecting service unit 21 designates a requirement required by the function of collecting the data items. The collecting service unit 21 includes a collecting server unit 211, a customer database 212, a vehicle type function database 213, a collecting requirement unit 214, a log analysis unit 215, and an analysis result 216.

The customer database 212 manages basic information about a customer (a driver who uses the mobile telephone 3 in FIG. 1) and collecting items set in the past. The vehicle type function database 213 holds unique collecting function IDs for both a data item that can be collected as standard and a data item that can be collected by extension for each vehicle type.

The collecting server unit 211 operates as a WEB server accessed by a collecting application 31 of the mobile telephone 3. The driver designates a vehicle type of the vehicle 1 on the mobile telephone 3 and inquires of the data center 2 about data items that can be collected. The collecting server unit 211 returns a list of the data items that can be collected by the vehicle 1 as standard and the data items that can be collected by extension in response to a request from the mobile telephone 3, with reference to the vehicle type function database 213. The driver designates data items desired to be collected in the vehicle 1 using the mobile telephone 3.

The collecting requirement unit 214 acquires the collecting function IDs of the collectable data items designated by the driver from the vehicle type function database 213. The collecting requirement unit 214 outputs the collecting function IDs to the OTA service unit 23 together with the customer ID and the vehicle model ID of the driver stored in the customer database 212.

The log 22 is obtained by accumulating log data transferred from the vehicle. The log analysis unit 215 analyzes the log 22 and outputs the analysis result 216. For example, the analysis result 216 can be passed to service that require customer analysis of a marketing service, a telematic insurance service, and the like, and can be utilized in these services.

The OTA service unit 23 distributes an update version of the program to the vehicle 1. The OTA service unit 23 includes a collecting request analysis unit 231, config data 232, a vehicle ECU software database 233, an OTA program generation unit 234, the OTA program database 24, a customer database 236, and an OTA distribution unit 237.

The config data 232 is obtained by receiving the config data 1382 held by the vehicle 1 from the vehicle 1. The vehicle ECU software database 233 holds data items that can be collected for software versions of each ECU included in the vehicle 1. As for the collecting program 1371, the collectable data items are held for each version of the collecting program 1371. As for the operation program included in the ECUs, data items that can be output to the in-vehicle network 11 are held for each version of the operation program.

The collecting request analysis unit 231 designates a function capable of collecting data items desired by the driver, based on the collecting function IDs received from the collecting service unit 21. The collecting request analysis unit 231 acquires program IDs as program versions (both the collecting program 1371 and the operation program) capable of collecting the data items desired by the driver from the vehicle ECU software database 233, based on the collecting function IDs and the program IDs of the respective ECUs held by the config data 232. The collecting request analysis unit 231 outputs the acquired program IDs to the OTA program generation unit 234.

The OTA program database 24 holds versions of the programs (both the collecting program 1371 and the operation program). The versions of the respective programs are uniquely identified respectively by the program IDs. The programs each are not necessarily completed by themselves, and may be a module or the like having a specific function or the like.

The OTA program generation unit 234 acquires the updated versions of the programs using the ID of the collecting program 1371 and the IDs of the operation programs of the ECUs as the program IDs with reference to the OTA program database 24, and generates a program to be distributed to the vehicle 1 by the OTA using the updated version. In a case where the OTA program database 24 holds program modules, the program to be distributed to the vehicle 1 may be generated by combining the modules.

The customer database 236 holds security information (for example, an electronic signature) for each driver. After addition of a security mechanism corresponding to the driver of the vehicle 1, the OTA distribution unit 237 distributes the program generated by the OTA program generation unit 234 to the vehicle 1 with reference to the customer database 236.

FIG. 7 is a flowchart describing that the data center 2 updates the collecting program 1371 and the operation program. Each step in FIG. 7 will be described below.

(FIG. 7: Step S701)

The driver of the vehicle 1 designates data items to be collected by the vehicle 1 using the collecting application 31 of the mobile telephone 3. A collecting condition such as a collecting time interval can also be designated. The data items and the collecting condition are collectively referred to as a collecting condition hereinafter.

(FIG. 7: Step S702)

The collecting server unit 211 acquires the collecting condition from the mobile telephone 3. The collecting requirement unit 214 designates the collecting function IDs of the collectable data items designated by the collecting condition, and outputs the customer information and the collecting function IDs to the OTA service unit 23.

(FIG. 7: Steps S703 to S704)

The collecting request analysis unit 231 designates the vehicle 1 from the customer information, and requests the vehicle 1 to transfer the config data 1382 to the data center 2 (S703). The collecting function unit 131 transfers the latest config data 1382 in the vehicle 1 to the data center 2 (S704). As a result, the config data 1382 held by the vehicle 1 matches the config data 232 held by the data center 2.

(FIG. 7: Step S705)

The collecting request analysis unit 231 acquires the program ID of the collecting program 1371 and the program ID of the operation program of each ECU from the vehicle ECU software database 233 based on the collecting function IDs and the config data 232. The collecting request analysis unit 231 transmits these program IDs to the OTA program generation unit 234.

(FIG. 7: Step S706)

Based on the program ID of the collecting program 1371 and the program IDs of the operation programs of the ECUs, the OTA program generation unit 234 generates programs (update versions of programs) to be OTA distributed with reference to the OTA program database 24. The OTA program may be fully updated or differentially updated.

(FIG. 7: Step S707)

The OTA distribution unit 237 simultaneously distributes the collecting program 1371 and the update versions of the operation programs of the ECUs to the vehicle 1 using the OTA function.

(FIG. 7: Step S708)

The ECUs in the vehicle 1 respectively update the software using the update versions of the programs distributed by the OTA function. The collecting function unit 131 updates the config data 1382. The diagnosis management unit 1381 periodically updates the config data 1382 separately from this step.

(FIG. 7: Steps S709 to S710)

The collecting function unit 131 transmits the collected log to the collecting server unit 211 (S709). The log analysis unit 215 analyzes the collected log and accumulates the analysis result (S710).

First Embodiment: Summary

The ECU 13 according to the first embodiment collects the config data 1382 having the update states of the programs provided in the ECUs, acquires update version of the programs respectively corresponding to the update states in the config data 1382 from the data center 2, and updates the programs in accordance with the update programs. The other ECUs also update the operation programs in accordance with the update versions of the programs received from the similar data center 2. The software states such as software versions and free ROM spaces of all the ECUs mounted on the vehicle 1 are matched between the vehicle 1 and the data center 2, and are managed. This achieves appropriate program update. Further, the software states of all the ECUs are collectively managed by the ECU 13, and thus the operation programs of the ECUs and the collecting program 1371 of the ECU 13 can be generated in association with each other.

The ECU 13 according to the first embodiment issues the diagnosis command 1384 on the in-vehicle network 11 based on the diagnosis CAN command map 1383, and the ECU that has received the diagnosis command 1384 returns the software state as a response thereto. As a result, the software states of the ECUs can be aggregated as the config data 1382 on the ECU 13.

In the ECU 13 according to the first embodiment, the collecting program 1371 is configured to be able to change, for each version of the collecting program 1371, at least a frequency of collecting data from the ECUs, data items to be collected, or a frequency of transmitting the collected data to the data center 2. As a result, the user can freely customize the data collecting processing to be performed in the vehicle 1. For example, after cancellation of a function controlled in a current ECU included in the vehicle 1 or addition of a new function, the user can add a collecting condition linked to the cancellation the addition. By customizing and acquiring the information about the vehicle 1, various types of information about the vehicle 1 can be utilized in external services such as a telematic insurance service or a marketing service.

In the update system according to the first embodiment, the user of the vehicle 1 customizes the data collecting items via the mobile telephone 3, and the data center 2 generates the operation program and the collecting program 1371 capable of collecting the customized data items and transmits the programs to the vehicle 1. As a result, the user can freely customize the data items collected on the vehicle 1 while updating the operation programs of the respective ECUs included in the vehicle 1 and the collecting program 1371 in association with each other.

Second Embodiment

The first embodiment has been described that the operation programs of the ECUs and the collecting program 1371 are updated in association with each other. These programs are not necessarily updated at the same time, and may be updated as described in the following examples.

(Update Example 1) The collecting program 1371 and the operation program on any one ECU (Update Example 2) The collecting program 1371 and the operation program on the ECU 13

(Update Example 3) The collecting program 1371

(Update Example 4) The collecting program 1371 and the operation programs on any two or more ECUs (some of the ECUs of the vehicle 1)

In a case where the programs cannot be updated because the free ROM spaces are not enough in the ECUs, the program update can be inhibited. When the update has been inhibited, the vehicle 1 notifies the data center 2 of the inhibition of the update. Furthermore, the OTA service unit 23 can notify the user of the mobile telephone 3 about that fact via the collecting service unit 21.

Modifications of the Present Invention

The present invention is not limited to the above-described embodiments, and includes various modifications. For example, the above-described embodiments have been described in detail for easy understanding of the present invention, and are not necessarily limited to those having all the described configurations. Further, a part of the configuration of one embodiment can be replaced with the configuration of the other embodiments, and the configuration of the other embodiments can be added to the configuration of one embodiment. In addition, the other configurations can be added to, deleted from a part of the configuration in each embodiment, and a part of the configuration in each embodiment can be replaced with the other configurations.

The above embodiments have described that the collecting program 1371 in the ECU 13 is updated, and the operation program in another ECU (for example, the ECU 14) is updated in association with the collecting program. In an actual system, a format or the like of a data item to be collected can be changed by updating an operation program of the another ECU. Therefore, format conversion processing or the like might be necessarily executed by the operation program 1372. Therefore, the operation program 1372 may be updated in association with the collecting program 1371 and each operation program.

The above embodiments have described that the diagnosis management unit 1381 collects the config data 1382 from the ECU 14, and the collecting unit 1331 and the collecting program 1371 collect various data items (vehicle data) of the vehicle 1. However, these processing may be aggregated as one program. For example, one program may be provided as the collecting function unit 131, and the program may collect the config data 1382 and the vehicle data. That is, if the ECU 13 executes the processing, the division of roles between programs may be arbitrary.

In the above embodiments, the data items collected by the collecting function unit 131 are not limited to the software states of the ECU included in the vehicle 1, and may be any data items indicating the state of the vehicle 1. For example, data indicating a state of a device such as a sensor or an actuator controlled by a target ECU can be collected from the target ECU. In addition, as illustrated, information such as a travel route of the vehicle 1 can be collected from a car navigation ECU, and information regarding the preference of a driver can be collected from an infotainment ECU.

In the above embodiments, at least one of the operation program and the collecting program 1371 may be different for each vehicle type (manufacturer, model number, etc.) of the vehicle 1. In this case, data items or the like that can be collected are defined for respective vehicle types in the vehicle type function database 213, and the vehicle ECU software database 233 may be configured such that program IDs corresponding to collecting function IDs differ for the respective vehicle types.

In the above embodiments, the collectable data items may be different for respective vehicle types of the vehicle 1. Further, constraints related to the data collecting may be defined, such as data items that cannot be collected at the same time. This constraint may be defined in the vehicle type function database 213, for example. In a case where the user selects a data item according to the constraint on the mobile telephone 3, the selection may be returned to the mobile telephone 3 via the collecting server unit 211, or a selection screen configured such that such a data item cannot be selected from the beginning may be provided from the collecting server unit 211 to the mobile telephone 3.

In the above embodiments, when the data center 2 distributes the update versions of the programs of the ECUs to the vehicle 1, the update versions of the programs may be directly distributed from the data center 2 to the ECUs respectively, or the data center 2 may designate only a destination ECU and a gateway device in the vehicle 1 may receive the update versions of the programs of the ECUs. In the latter case, the update versions of the programs are distributed respectively to the ECUs via the gateway device.

In the above embodiments, the ECU (the ECU 13 in the embodiments) that collects various data of the vehicle 1 may be a control device that controls any function of the vehicle 1, and may not necessarily be an ECU having a role of generally controlling other ECUs.

In the above embodiments, the ECUs and the operation function units included in the data center 2 each can be configured by hardware such as a circuit device having these functions, or by an operation device executing software having these functions. The ECUs and the operation function units each can also be configured by a combination of hardware and software. For example, the collecting unit 1331, the operation unit 1341, the diagnosis management unit 1381, the collecting service unit 21, and the OTA service unit 23 can be configured by hardware, software, or a combination thereof. Among these function units, function units (examples: the collecting log 1332, the log 1342, the config data 1382, and the log 22, and each database) that accumulate data may be configured as a part of the operation function unit, or only a data portion may be mounted separately from the operation function unit.

REFERENCE SIGNS LIST

1 vehicle
11 in-vehicle network
12 TCU
13 ECU
131 collecting function unit
1331 collecting unit
1341 operation unit
135 output unit
136 RAM
1371 collecting program
1372 operation program
1381 diagnosis management unit
1382 config data
14 ECU
142 operation unit
145 diagnosis unit
1441 operation program
2 data center 21 collecting service unit
22 log
23 OTA service unit
24 OTA program database
3 mobile telephone
4 base station

The invention claimed is:

1. A vehicle control device that controls an operation of a vehicle, the vehicle control device comprising:
a program storage unit that stores a program having a function provided by the vehicle control device;
an operation unit that executes the program; and
a configuration data storage unit that stores configuration data indicating an update state of the program,
wherein the program storage unit stores, as the program,
an operation program having an operation function provided by the vehicle control device, and
a collecting program having processing for collecting second program update state data from a second vehicle control device mounted on the vehicle, the second program update state data including an update state of a second program installed on the second vehicle control device and a memory state indicating an amount of available memory associated with the second vehicle control device, and
wherein the operation unit aggregates and transmits the configuration data associated with the vehicle control device of the vehicle and the second program update state data associated with the second vehicle control device of the vehicle to a server that distributes an update version of the program,
receives the update version of the program corresponding to the configuration data from the server, and
updates the program stored in the program storage unit in accordance with the update version of the program received from the server.

2. The vehicle control device according to claim 1, further comprising a diagnosis command map having a diagnosis command used to diagnose whether the second vehicle control device is defected and destination information about the diagnosis command,
wherein the collecting program causes the operation unit
to request for the second program update state data upon transmission of the diagnosis command to the second vehicle control device in accordance with the diagnosis command map, and
aggregate a response to the diagnosis command to the configuration data as the second program update state data.

3. The vehicle control device according to claim 1, wherein
the collecting program causes the operation unit to collect vehicle data indicating a state of the vehicle, and
transmit the collected vehicle data to the server.

4. The vehicle control device according to claim 3, wherein
the collecting program has a frequency of collecting the vehicle data, items to be collected as the vehicle data, and a frequency of transmitting the vehicle data to the server, and
the operation unit updates at least the frequency of collecting the vehicle data, the items to be collected as the vehicle data, or the frequency of transmitting the vehicle data to the server in the collecting program in accordance with the update version of the program.

5. A vehicle system comprising:
the vehicle control device according to claim 1; and
a second vehicle control device mounted on the vehicle,
wherein the second vehicle control device
receives an update version of the second program corresponding to the configuration data from the server, and
updates the second program in accordance with the update version of the second program received from the server.

6. The vehicle system according to claim 5, wherein
the collecting program defines items to be collected as vehicle data indicating a state of the vehicle,
the second program includes providing the vehicle data,
the operation unit updates the items to be collected as the vehicle data in the collecting program in accordance with the update version of the program, and
the second vehicle control device updates the second program in accordance with the update version of the second program, and thus the second program includes providing the items updated in accordance with the update version of the program.

7. An update system that updates a program executed by a vehicle control device mounted on a vehicle, the update system comprising:
the vehicle system according to claim 5; and
a server that transmits an update version of the program to the vehicle control device and transmits an update version of the second program to the second vehicle control device.

8. The update system according to claim 7, wherein
the collecting program is configured to cause the operation unit to collect vehicle data indicating a state of the vehicle, and
the server receives an item request for designating items to be collected as the vehicle data from a user terminal, and
transmits, to the vehicle control device, the collecting program having collecting the items designated by the item request as the vehicle data, as the update version of the program.

9. The update system according to claim 8, wherein
the server upon receiving the item request, transmits, to the vehicle control device, a configuration data request for transmission of the configuration data,
designates an update state of the program using the configuration data received from the vehicle control device in response to the configuration data request,
generates the collecting program including collecting the items designated by the item request as the vehicle data in accordance with the designated update state of the program and the items designated by the item request, and
transmits the generated collecting program to the vehicle control device as the update version of the program.

10. The update system according to claim 9, wherein
the server designates an update state of the second program using the configuration data received from the vehicle control device in response to the configuration data request,
generates the second program including providing the items designated by the item request as the vehicle data in accordance with the designated update state of the second program and the items designated by the item request, and
transmits the generated second program to the second vehicle control device as the update version of the second program.

11. The update system according to claim 8, wherein the server includes a database that stores an updated version of the collecting program for each combination of the items to be collectable by the collecting program, acquires the updated version of the collecting program that collects all the items designated by the item request from the database, and transmits, to the vehicle control device, the acquired update version of the collecting program as the update version of the program.

12. The update system according to claim 7, wherein the server transmits the update version of the second program to the second vehicle control device together with the update version of the program, and the second vehicle control device updates the second program in accordance with the received update version of the second program in association with the update of the program in the vehicle control device.

\* \* \* \* \*